United States Patent
Kaplan et al.

(10) Patent No.: US 7,734,692 B1
(45) Date of Patent: Jun. 8, 2010

(54) NETWORK COLLABORATION SYSTEM WITH PRIVATE VOICE CHAT

(75) Inventors: Jonathan H. Kaplan, Cambridge, MA (US); Nicole Y. Mordecai, Weston, MA (US); Joseph E. Provino, Arlington, MA (US); Michael Wessler, Westwood, MA (US); Harold Fox, Cambridge, MA (US)

(73) Assignee: Oracle America, Inc., Redwood Shores, CA (US)

( * ) Notice: Subject to any disclaimer, the term of this patent is extended or adjusted under 35 U.S.C. 154(b) by 1354 days.

(21) Appl. No.: 11/187,222

(22) Filed: Jul. 22, 2005

(51) Int. Cl.
*G06F 15/16* (2006.01)
(52) U.S. Cl. .................... 709/204; 709/205; 709/228
(58) Field of Classification Search ............... 709/204, 709/205, 228
See application file for complete search history.

(56) References Cited

U.S. PATENT DOCUMENTS

| | | | | |
|---|---|---|---|---|
| 5,392,400 A | * | 2/1995 | Berkowitz et al. | 709/203 |
| 5,491,743 A | * | 2/1996 | Shiio et al. | 709/204 |
| 6,665,707 B1 | * | 12/2003 | Bates et al. | 709/204 |
| 7,240,111 B2 | * | 7/2007 | VanHarlingen et al. | 709/204 |
| 7,328,239 B1 | * | 2/2008 | Berberian et al. | 709/204 |
| 7,346,654 B1 | * | 3/2008 | Weiss | 709/204 |
| 7,360,164 B2 | * | 4/2008 | Bjoernsen et al. | 709/204 |
| 7,454,460 B2 | * | 11/2008 | Ivashin | 709/204 |
| 2004/0008635 A1 | * | 1/2004 | Nelson et al. | 709/204 |

OTHER PUBLICATIONS

Be Heard on Xbox Live http://www.xbox.com/en-us/live/about/features-voice.htm Apr. 2, 2008 One Page Microsoft Corporation, USA.

* cited by examiner

*Primary Examiner*—Phuoc Nguyen
(74) *Attorney, Agent, or Firm*—Brooks Kushman P.C.

(57) ABSTRACT

A network collaboration system facilitates collaborations between network clients having access to a digital network. The system uses audio mixes to provide different levels of voice conferences between the meeting participants. In a main collaboration, those participating in the main collaboration receive an audio output that includes audio inputs from the other participants. A subset group of clients may also have a voice chat, in which their audio inputs are removed from the outputs delivered to the clients not participating in the voice chat. Meanwhile, the participants in the voice chat hear each other at full volume, but hear the collaborators who are not part of the voice chat at a reduced volume.

14 Claims, 7 Drawing Sheets

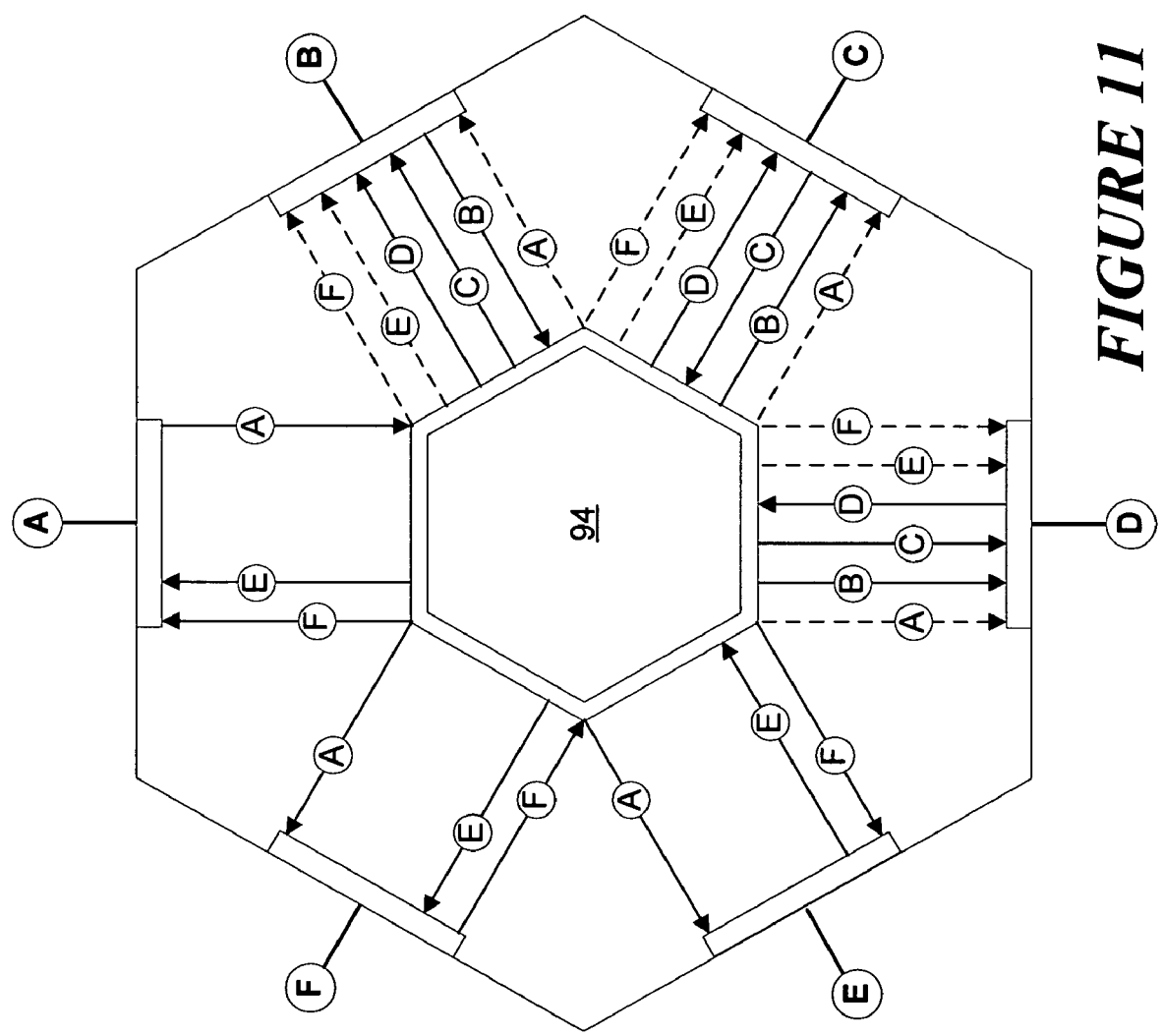

NETWORK COLLABORATION SYSTEM WITH PRIVATE VOICE CHAT

FIELD OF THE INVENTION

This invention is directed, generally, to the field of collaboration software systems for use on a digital network and, more specifically, to voice communications on such systems.

BACKGROUND OF THE INVENTION

With the rise of networked computing systems, particularly in business settings, new tools have emerged that allow network users, or clients, to interact with one another in various ways. Email, for example is a ubiquitous communication means which allows text messages to be communicated selectively over a network. Similarly, instant messaging and text-based "chats" have proven popular tools for communicating textual information between network clients. More recently, audio communication has been used over digital networks, the best-known format being the "voice-over-internet protocol" (VOIP). Even video conferencing has been used over digital networks, to varying degrees of success.

Collaboration software, sometimes referred to as "groupware" is designed to allow multiple network users to work on a single project together from separate workstations. One version of such software is "NOTES" which is a registered trademark and product of Lotus Development Corporation, Cambridge, Mass. Another is "NETMEETING" which is a registered trademark and product of Microsoft Corporation, Redmond, Wash. The goal of these products is to allow conferencing between multiple network clients, and collaboration among those clients in which they interact to manipulate a target such as a document or "whiteboard." However, while improvements have been made in these products, there are areas in which the ability of users to communicate or collaborate may be improved.

SUMMARY OF THE INVENTION

In accordance with the present invention, a network collaboration system is provided that facilitates interaction between network clients having access to a digital network. The system is directed to facilitating interaction between individuals via the network using a variety of communication media, including voice, text messages, and manipulation of shared collaboration space. The collaboration space makes network-based meetings more versatile and intuitive to access and use.

The collaboration system includes an audio communications tool that accepts audio inputs from network clients and provides audio outputs to clients that comprise a selective mix of the audio inputs. Each client has a network interface that allows the initiation of a collaboration between network clients selected using the interface. Upon the initiation of the collaboration, the audio communications tool mixes together audio inputs from each of the participating clients, and delivers audio outputs to each. During the main collaboration, if none of the clients has voluntarily muted his or her audio input, an audio output received by each client may be a mix of the audio inputs of all of the other clients involved in the collaboration. Thus, the parties to the collaboration all hear each other, as if in a live meeting.

In an exemplary embodiment of the invention, a subset group of fewer than all the collaborating clients can initiate a private audio communication with one another without interrupting the collaboration. Using the network interface, one of the collaborating clients can initiate a voice chat feature that enables the private communication. Upon the initiation of a voice chat, a new audio mix is created for the collaborating clients. The audio inputs of those in the subset group of collaborating clients that are participating in the voice chat are still heard at full volume by the other members of the subset group. However, the audio inputs of the members of the subset group are omitted from the audio outputs delivered to the collaborating clients that are not part of the subset group. Thus, the parties to the voice chat can still hear one another clearly, but they cannot be heard by the collaborating clients that are not part of the voice chat.

The network interface may include a main display window displayed on a video monitor of each collaborating client in which the identities of all of the collaborating clients are displayed. A voice chat window may also be displayed to the clients in the subset group in which the identities of the subset group clients are displayed. Indicia, such as brackets, may also be used in conjunction with each of the identities listed in the main display window to indicate to other collaborating clients that that client's audio input is muted. These indicia, of course, would be shown in conjunction with a client's listed identity when that client was participating in a voice chat. Similar indicia may also be used in the voice chat window. In one embodiment of the invention, members of the subset group may remain part of the subset group when rejoining the audio communication in the main collaboration. In such a case, the audio input of a member rejoining the collaboration would be added back to the audio outputs of the collaborating clients that are not part of the subset group. Indicia in the voice chat window may be used to indicate that the subset group member has returned to the main collaboration. That client may still return to the voice chat, and the audio mix will again be returned to a voice chat state, in which the other members of the subset group once again hear the full volume audio input of the returning client, but in which the audio input of the returning client is omitted from the audio outputs delivered to collaborating clients that are not members of the subset group.

When the members of the subset group are participating in a voice chat, the audio inputs of the collaborating clients that are not participating in the voice chat may still be heard. In one embodiment, the volume of audio inputs of those not participating in the voice chat is at a reduced volume in the audio outputs received by members of the subset group relative to the audio inputs of subset group members participating in the voice chat. Thus, while the members of the subset group participating in the voice chat hear each other at full volume, the audio from the collaborating clients who are not subset group members is quieter. In this way, the main collaboration may be heard "in the background" while the voice chat is underway. Any member of the subset group that leaves the voice chat to rejoin the main collaboration can still remain a group member, but is heard again in the main collaboration. That is, the audio input from that member is again introduced to the audio outputs delivered to the collaborating clients that are not part of the subset group, and is heard at a reduced volume by other members of the subset group. Meanwhile, the audio output delivered to the member leaving the voice chat has an audio input contribution from the subset group members that are still participating in the voice chat, but at a reduced volume relative to the volume of the audio inputs of the other collaborating clients (i.e., the voice chat is heard "in the background").

Further, in accordance with the present invention, a computer program product for facilitating interaction between network clients having access to a digital network is provided.

The computer program product comprises a computer usable medium having computer readable program code thereon. The computer usable medium may be any suitable medium as understood by those skilled in the art (for example, CD ROM or other tangible medium).

BRIEF DESCRIPTION OF THE DRAWINGS

The above and further advantages of the invention may be better understood by referring to the following description in conjunction with the accompanying drawings in which:

FIG. 11 is a depiction of the facilitator window of FIG. 4 with two voice chat windows open below it.

DETAILED DESCRIPTION

Figure 1:
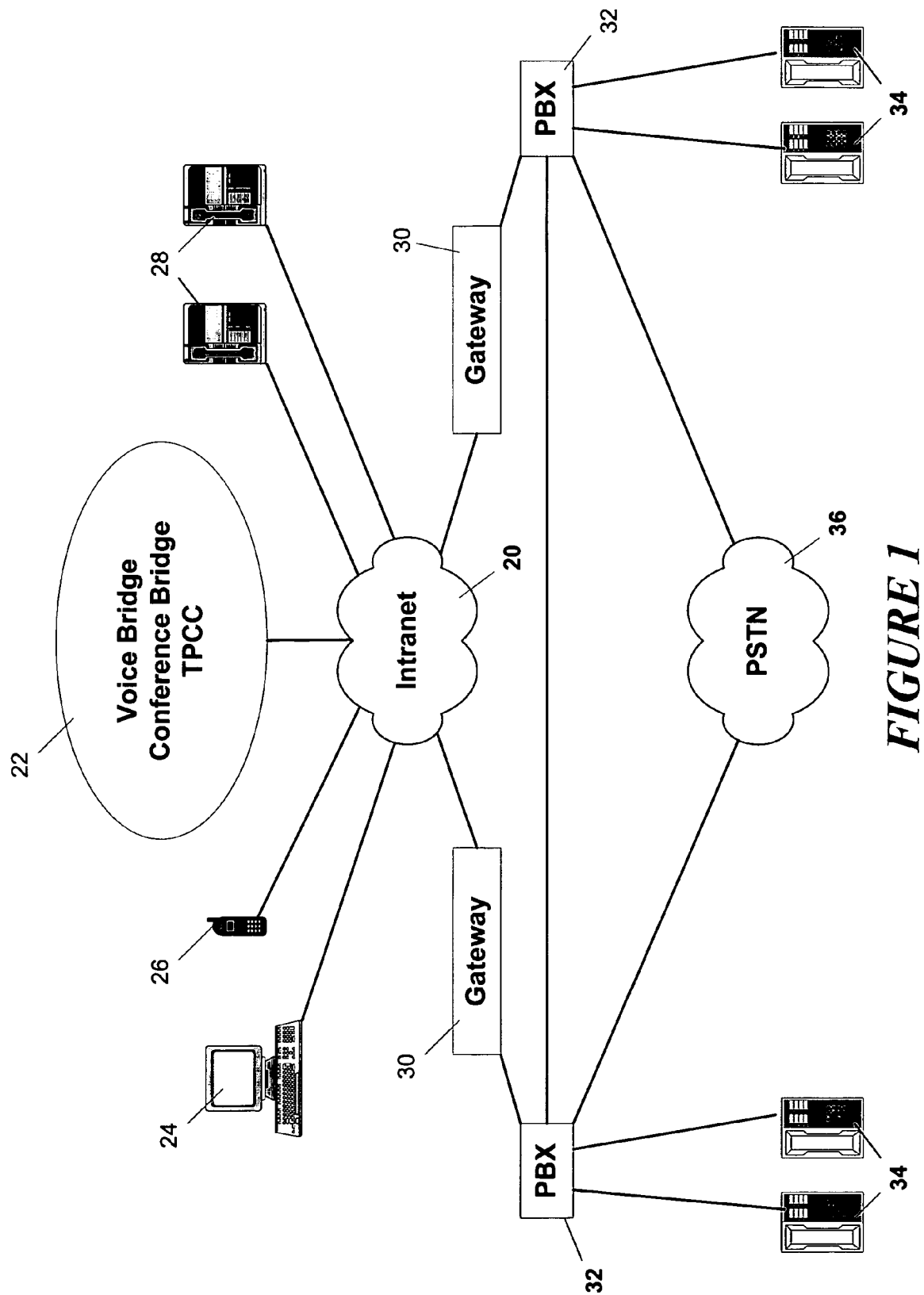
FIG. 1 is a graphical depiction of a network collaboration system environment typical of the present invention.

The collaboration tool of the present invention operates around a general backbone architecture that allows various access points and functionality. Shown in FIG. 1 is a general overview of some of that accessibility. A digital network, such as intranet 20, can serve as the primary connection medium for the system. Connected to the intranet is collaboration tool 22, via which the functionality of the system is established. A number of communication points on the intranet are also shown, such as workstation 24, wireless phone (or other wireless communication device) 26, and software phones 28, which are typically based on voice-over-internet protocol (VOIP). These different communications points all transmit and receive data via the intranet 20, and can access the collaboration tool 22 thereby. Also connected to the intranet of FIG. 1 are gateways 30, each of which provide connection to private branch exchange (PBX) switches 32 that each service a number of conventional telephone sets 34. The PBX switches 32 may also be connected to a public service telephone network (PSTN) 36, which operates according to conventional telephony principles, as well as to each other, if the two switches are part of a common internal switching network. Those skilled in the art will recognize that the various connection points shown in FIG. 1 are for example only, and that numerous different connectivity arrangements are possible.

Figure 2:
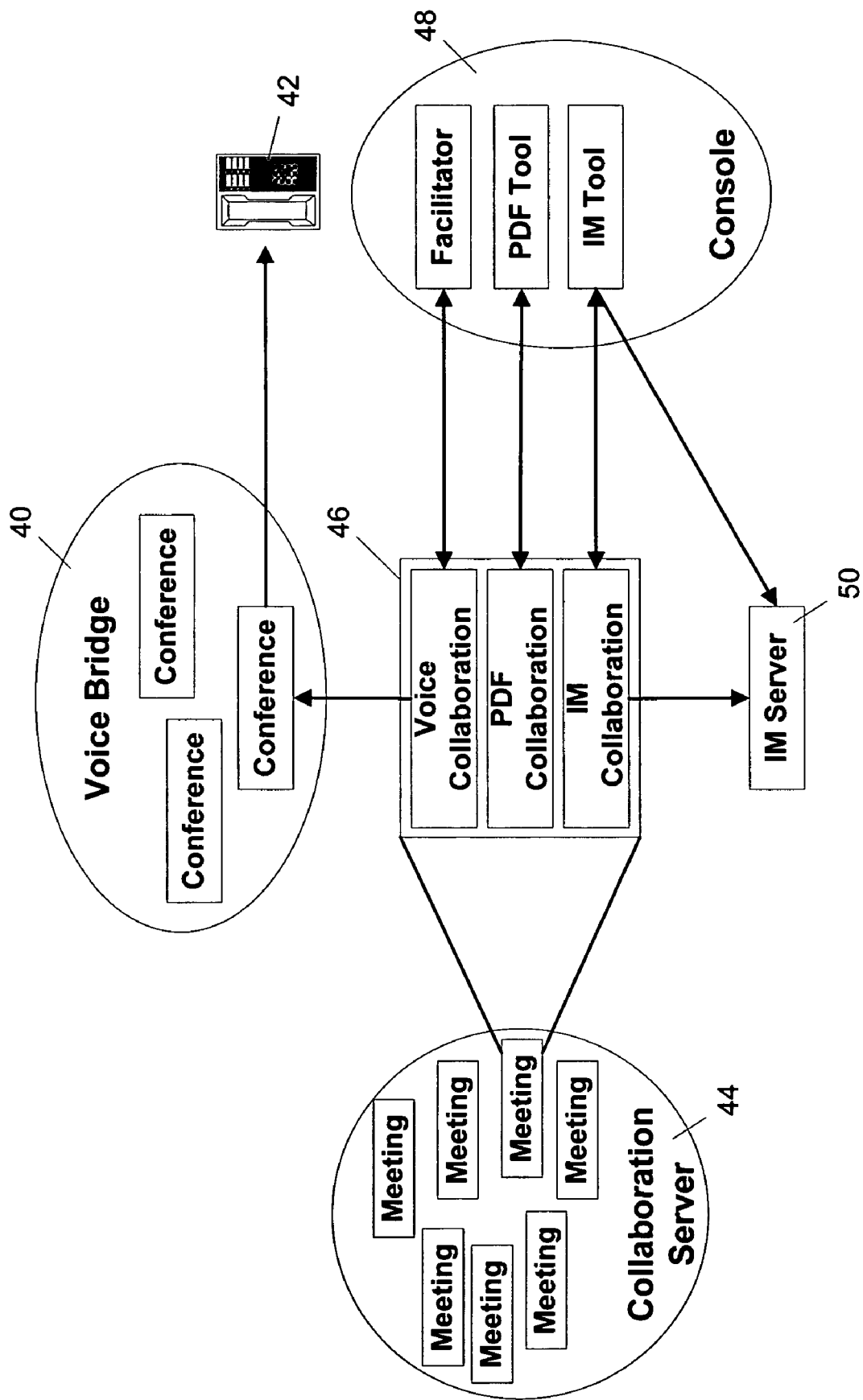
FIG. 2 is a graphical view of the components of a collaboration tool according to the present invention.

The collaboration tool provides a number of unique functions that simplify and enhance distributed meetings, making them more effective. Several different software components work in concert to provide this functionality, and the illustration of FIG. 2 shows a generalized breakdown of these components. Given that the central communication medium of most meetings is voice, the primary interface of the system is voice bridge 40. The voice bridge, which is discussed in more detail below, is a mixing tool for managing simultaneous streams of packet-switched voice data, and rendering custom mixes of the data streams for each of the users. This custom mixing of the voice data is key to enabling a number of the useful features of the collaboration tool. FIG. 2 demonstrates this capability by the indication of an output from a conference being managed by the voice bridge 40 to communication device, in this case telephone set 42. Those skilled in the art will recognize that the data may actually pass through other layers and media before reaching the phone set itself. As is also indicated in FIG. 2, the voice bridge is capable of managing the mixing tasks for multiple conferences at the same time.

A collaboration server 44 manages the collaboration functions for each of the meetings making use of the collaboration tool at a given time. For each of these meetings, a collaboration space 46 is established, within which data sharing is provided in different formats (for clarity, only one collaboration space is shown graphically in FIG. 2). A user console, available to each user that is connected via an appropriate interface, provides access to many of the features of the collaboration tool. As shown, a facilitator provides the user with control over the voice collaboration, a portable document format (PDF) (or other document format) tool provides control over PDF collaboration, and an instant messaging (IM) tool provides control over a IM collaboration, in conjunction with an IM server 50. How each of this interface components operates will be understood from the description below.

Figure 3:
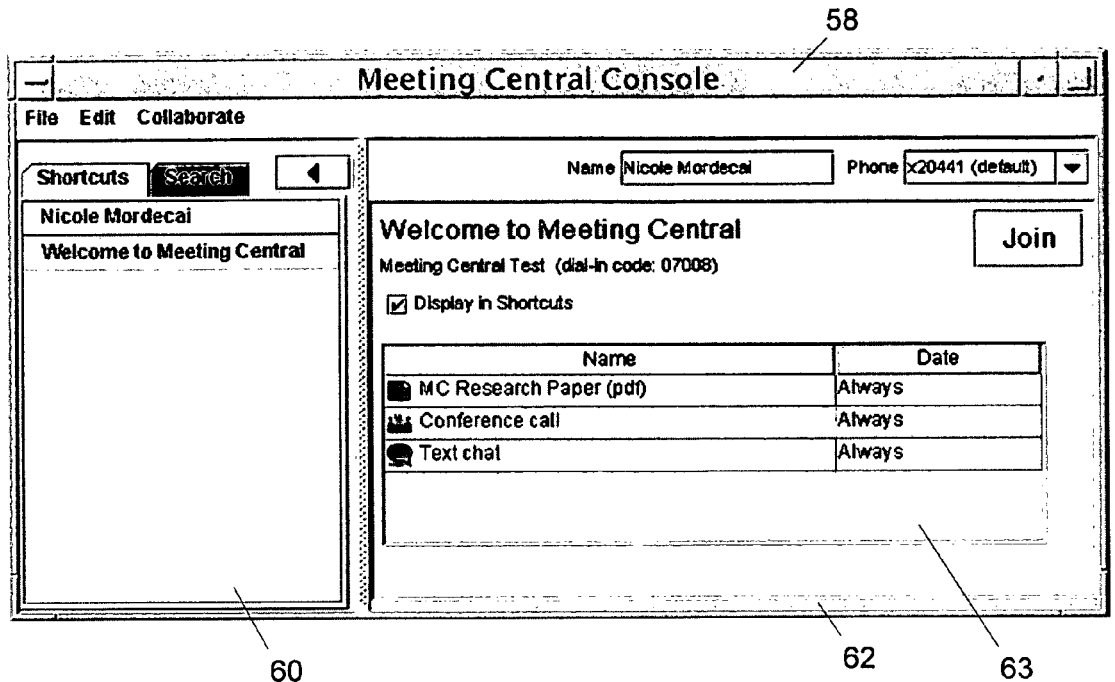
FIG. 3 is a depiction of a display window of a console that may be used with the collaboration tool of FIG. 2.

The collaboration tool is preferably based on a graphical user interface (GUI) application accessible by a user of the collaboration tool. The interface makes use of controls and information placed in different windows so as to provide an intuitive look and feel for manipulating the conditions for a particular user. Upon launching the application, and optionally logging in via a login control window, the application presents a "central console" window 58, as shown in FIG. 3. The user's information is displayed along a bar near the top of the window. Along the left side of the window is a list 60 of current people and meetings recognized by the collaboration tool. Selection of an item on the list brings up information regarding that item in the information pane 62. When a meeting is highlighted in the list, the user may select from the listed items in the information pane that they would like to join, such as a conference call, a text chat or a document collaboration. Highlighting of the items in the information pane and clicking the "join" button connects the user to the meeting in the specified communication mode or modes. If a person is highlighted in the list 60, the pane 62 may bring up information regarding that person, including a radio button that may be clicked to initiate contact with the selected person.

Figure 4:
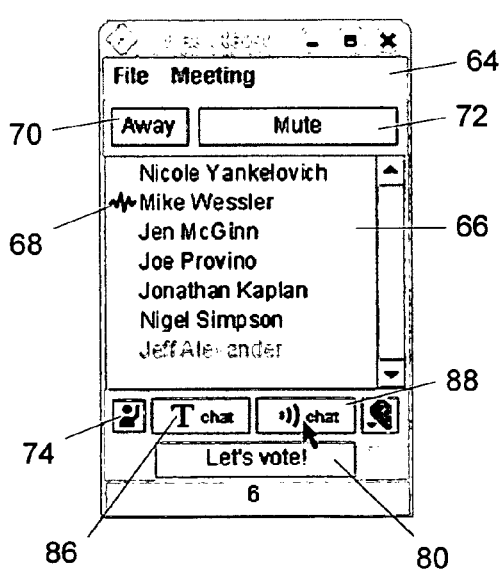
FIG. 4 is a depiction of a display window for a facilitator of a collaboration tool like that shown in FIG. 2.

When a user joins a meeting, the application launches a facilitator window 64, an example of which is shown in FIG. 4. A number of features may be facilitated through use of the facilitator, many of which are indicated in the figure. The main portion 66 of the facilitator window contains a list of meeting attendees. Those who have joined the meeting are shown in dark text and those who have left are shown in gray. Shown on the facilitator window is a button 70 labeled "away," which may be clicked by a user when they are going to be temporarily away from the meeting. Clicking this button mutes that person's audio, and causes his or her name to appear in gray on the facilitator windows of all participants.

To indicate which of the participants is speaking at any given time, a speaking indicator 68 appears next to a person's name when the amount of sound on that person's channel is above a given threshold for a given duration. In one embodiment, the darkness with which the speaking indicator is displayed may increase with the time and intensity of the audio detected on that channel, while fading gradually during subsequent periods of quiet. A mute button 72 may also be clicked by a user to mute his or her channel. This helps to minimize extraneous noise being introduced to the meeting over channels of participants who are not speaking for a certain period of time. When a user mutes his or her channel, brackets appear around the name of that person in the facilitator window of all the participants, allowing all to see that that person's audio is muted.

Figure 5:
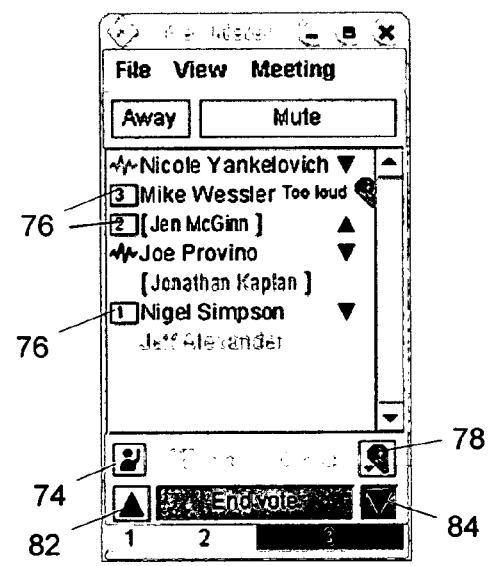
FIG. 5 is a depiction of the facilitator window of FIG. 4, with certain functions enabled.

When a person other than the current speaker would like an opportunity to say something, a hand raise button 74 may be clicked on that person's facilitator window. The result is the placement of a numbered icon 76 in the facilitator display of all the meeting participants, as shown in FIG. 5. The number shown in the icon corresponds to the order in which multiple participants may have clicked their respective hand raise icons. This order is represented in the facilitator displays of all of the participants, such that the first one to click has an icon with the number "1" shown next to his or her name, the second has the number "2," and so on. The use of the hand raise icons allows the current speaker to recognize that someone has a question, without the flow of the conversation being disrupted by a verbal interruption. The numbering of the icons allows the current speaker to know in which order the requests were made. When a user who has selected the hand raise icon, and is waiting to speak no longer wishes to speak, that person clicks the hand raise icon again, and the numbered icon next to his or her name is removed. Any numbered icons with higher numbers correspondingly increment by one. This may occur if the requester has already spoken, or if the reason for speaking is obviated. In one embodiment, if a person that has used the hand raise icon, and has been speaking for a long time, the system will remove the icon under the premise that this person now "has the floor."

Another problem that can be addressed non-verbally using the facilitator window is difficulty with the audio on another user's channel. The other user may be speaking too softly or too loudly, or may have background noise or a technical malfunction that makes it difficult or impossible to hear him or her. A audio button 78 is provided on the facilitator window that can be clicked by a user to indicate trouble with the audio channel of another participant. Clicking this button brings up a drop-down menu (not shown). This menu allows the user to select the speaker whose audio is poor, as well as choose from several options that describe the problem.

A voting button 80 on the facilitator allows anyone in the meeting to call for a vote. When the voting button is clicked by a user, two voting arrow buttons 82, 84 are enabled on the facilitator of each participant. The user calling for the vote verbally explains the basis of the vote, and what the selection of the up or down arrow means in the voting process. For example, the current speaker might suggest that the users click the up arrow 82 if they have finished reading a written item being discussed, or to click the down arrow 84 to indicate that more time is needed. Similarly, a vote might be to use the up arrow 82 to agree with a proposed idea, or the down arrow 84 if one disagrees. As shown in FIG. 5, the votes of each participant are displayed next to the participant's name on each user's facilitator. In one embodiment, the arrow buttons are different colors, such as the up arrow 82 being blue and the down arrow 84 being red. Colored bars at the bottom of the window may also be used to indicate the vote tally, the colors of the bars matching the colors of the up or down arrows that they represent. During the voting process, the display on the voting button 80 may change to indicate that a vote has been called. In such a case, the voting button 80, which may have read something like "let's vote" before being clicked initially, may instead read something like "end vote." Clicking of the button by the user that called the vote will then terminate the voting process, remove the arrow indicators next to the user names, and return the up and down arrow buttons 82, 84 to a disabled state.

Also on the facilitator is a private text chat button 86, shown most clearly in FIG. 4. Each meeting can have one or more group text chats associated with the meeting. The group text chats are identified in the collaboration table 63 of the information pane 62 shown in the central console window 58 (FIG. 3), and are visible by anyone in the meeting who wishes to join them. However, as mentioned above, a private chat window can also be opened by any user. To do this, the names of the participants with whom the chat is to take place are selected, for example by highlighting with a cursor, from the facilitator window 64 (e.g., users "Joe Provino" and "Jonathan Kaplan" in FIG. 4), and the private text chat button 86 is clicked. In one embodiment, double-clicking on a person's name will also open a text chat window shared by the user initiating the chat and the user whose name is clicked. The private text chat sessions will not appear in the meeting's collaboration table 63 since it is private and not available to others to join.

Figure 6:
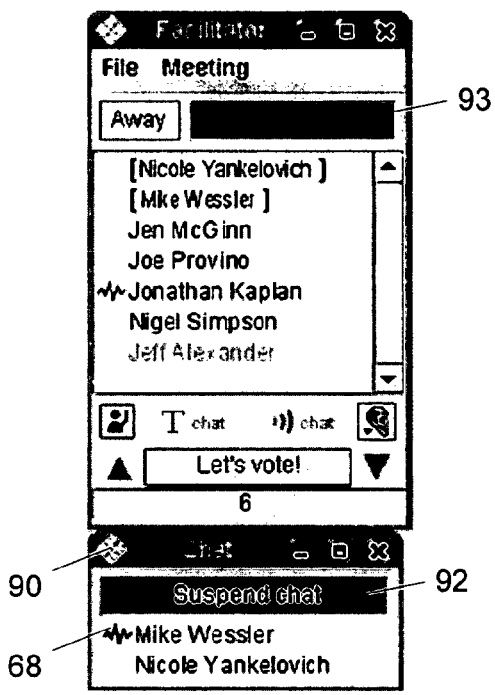
FIG. 6 is a depiction of the facilitator window of FIG. 4 with a voice chat window shown below it.

While in a meeting, it is also possible to have a private voice chat with one or more meeting participants without the other participants hearing the voice chat conversation. To initiate a voice chat, one or more names in the facilitator window 64 are highlighted, and the voice chat button 88 (shown most clearly in FIG. 4) is clicked. This opens a voice chat window 90 below the facilitator window of each participant to the voice chat, as shown in FIG. 6. Displayed in the voice chat box are the names of the chat participants. The names of the chat participants also appear bracketed in the facilitator window of all the meeting participants, indicating that their audio inputs to the main meeting have been muted. In an exemplary embodiment, there is no other indication to the other meeting participants that some of the members are engaged in a voice chat, although it might be surmised by the manner in which certain names in the facilitator window change from being bracketed to not bracketed. If desired, a user could mute his or her audio first, and then later join the voice chat, so as not to make it apparent that he or she is participating in the voice chat. Those skilled in the art will recognize that it would be possible to also display to all the users that a voice chat is taking place, if such a feature was desired.

FIG. 6 shows the facilitator and chat window display as it would appear to one of the chat participants, in this case "Mike Wessler" and "Nicole Yankelovich." As shown, with the initiation of the voice chat, the names of the participants are shown bracketed in the main facilitator window. The chat window will not be visible to those not participating in the voice chat, but the bracketed condition around the names of the chat participants will appear in the facilitator windows of all participants. Within the voice chat window, the voice chat participants see visual cues similar to those of the main facilitator window. For example, in FIG. 6, a speaking indicator 68 is displayed next to the name of chat participant "Mike Wessler." Similarly, brackets are placed around the name of a voice chat participant when that person's audio input is muted. This may occur when the participant mutes his or her audio input stream, or temporarily leaves the voice chat to return to the main meeting, as will occur when a user clicks on the "suspend/resume chat" button 92 displayed in the voice chat window 90.

Figure 7:
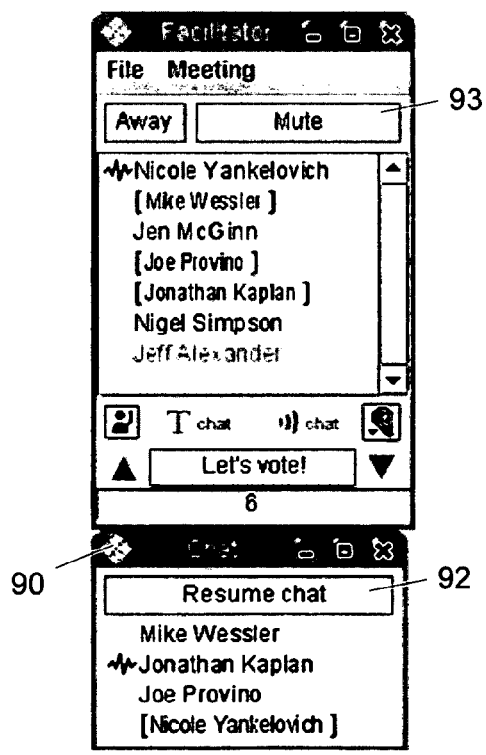
FIG. 7 is a depiction of the facilitator window of FIG. 4 with a window for a suspended voice chat shown below it.

When a voice chat participant returns to the main meeting, the brackets on that participant's name are removed in the main facilitator window, while they are added to the participant's name in the voice chat window. FIG. 7 is a depiction of the facilitator and voice chat windows of participant "Nicole Yankelovich" when that participant has left a voice chat to return to the main meeting. As shown the label on the "suspend/resume chat" button 92 has changed to read "resume chat," and may change color as well. In the voice chat window, the participant's name is shown bracketed, while there are no longer brackets present around the participant's name in the main facilitator window. Indeed, the participant is shown as speaking, as might be the case when responding to a question or comment made during the main meeting, a likely reason for returning to the main meeting. The other participants in the voice chat have continued, with participant "Jonathan Kaplan" speaking within the voice chat.

A participant may also suspend his or her participation in the voice chat using suspend/mute button 93 located in the main facilitator window. When participating in a voice chat, the clicking of this button will return the participant to the main meeting, and change the text of the button to "mute." When this button is clicked while the participant is participating in the main meeting, it will mute the audio input of the participant to all output sources, without returning the participant to the ongoing voice chat.

When a participant has chosen to "suspend" the voice chat, and has returned to the main meeting, that participant can still hear the voices of the other participants in the voice chat, but at a reduced volume. If participant "Nicole Yankelovich" wishes to return to the voice chat, clicking the "suspend/resume chat" button 92 will return the audio mix to the voice chat state, remove the brackets from that participant's name in the voice chat window 90, and place brackets around the same name in the main facilitator window. The audio input from participant "Nicole Yankelovich" will no longer be heard by those not participating in the voice chat, but will be heard at full volume by the other participants in the voice chat. Meanwhile, the audio output to participant "Nicole Yankelovich" will include the audio inputs from the other participants in the voice chat at full volume, while the audio inputs from those not participating in the voice chat will be at a reduced volume. Rejoining the voice chat will also result in the text displayed on the "suspend/resume chat" button 92 of participant "Nicole Yankelovich" to return to reading "suspend chat," and the color will change back to what it was originally. It is also possible for a participant in a voice chat to simply leave the voice chat altogether, closing the voice chat window, in which case that person will return to the main meeting, and will no longer hear the audio inputs of the participants in the voice chat.

Figure 8:
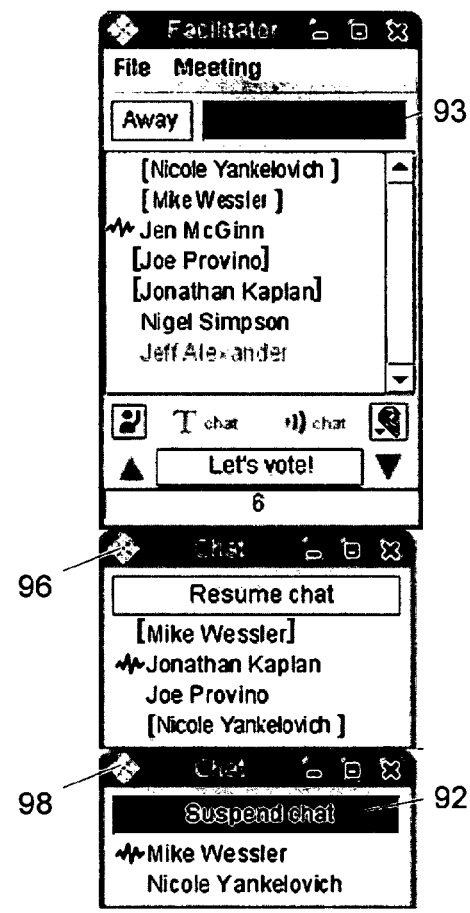
FIG. 8 is a graphical depiction of an audio mixing strategy according to the present invention.

Those skilled in the art will recognize that it would be possible to have multiple voice chats ongoing during a meeting. In the example shown in FIG. 8, two voice chats are going on simultaneously. A first voice chat, consisting of participants "Mike Wessler," "Jonathan Kaplan," "Joe Provino" and "Nicole Yankelovich" was created after the initiation of the meeting, as indicated by voice chat window 96. Thereafter, a second voice chat was formed with participants "Mike Wessler" and "Nicole Yankelovich." This results in a second voice chat window 98 being opened beneath window 96. The characteristics of the second voice chat window are the same as the first. As shown in the figure, the names of the participants active in the second voice chat are shown bracketed in both the main facilitator window and the first voice chat window 96. Although these two participants are participants in each of the two voice chats, it is not necessary that the group of participants in the second voice chat be a subset of the group of participants in the first voice chat. The second voice chat may contain any of the participants from the main meeting. For any participant that is a member of voice chats in addition to the main meeting, the only audio inputs that will be heard at full volume are those of others that are currently participating at the same level as the participant in question. For example, if a participant is a member of two voice chats, and is currently participating in one of them, the audio inputs of participants that are not members of the current voice chat are heard at a reduced volume.

While a participant is in a voice chat, that person's audio output to the other chat participants is at full volume, but muted in the main meeting audio mix, as well as in any other voice chats that the person has joined but in which he or she is not presently participating. Meanwhile, the audio inputs from the main meeting are still provided to the participants in the voice chat, but at a reduced volume. Thus, those participating in the voice chat can hear each other clearly, and can still hear the main meeting conversation "in the background." These changes in the audio mixing may be best understood by referring to FIGS. 9-11.

Figure 9:
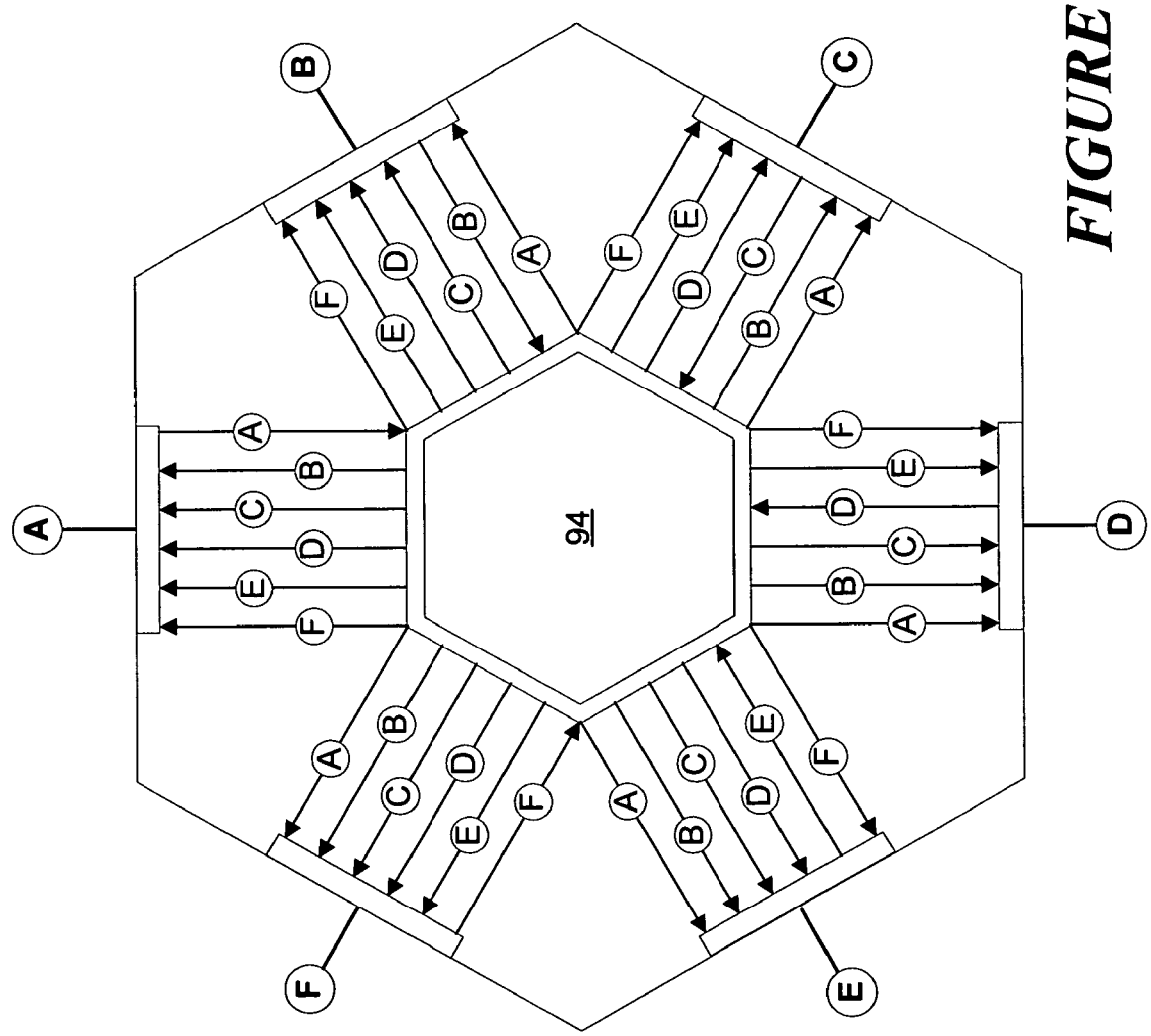
FIG. 9 is a graphical depiction of an audio mixing strategy similar to FIG. 8 at a time when several audio inputs are muted.

FIG. 9 is a graphical depiction of how the audio streams are mixed among participants to a meeting. In an exemplary embodiment of the invention, the audio stream of each participant is converted to a stream of data packets that may be transmitted over a digital medium. Methods of generating and handling such packet-switched data are well known in the art, and will not be discussed in detail herein. However, the manner in which the audio streams are distributed among the meeting participants is relevant to a desired operation of the collaboration tool.

In FIG. 9, each of the meeting participants is represented by a node connected to a network over which audio data is transmitted to and from the participants. In this example, there are six nodes, labeled A through F, representing six meeting participants that each provide an audio input to the meeting, and that each receive an output audio mix. The audio connection between any of the nodes and the network consists of an audio input, which is typically a voice input from the user represented by that node, and an audio output, which is some mix of voice data from the other meeting participants. To demonstrate the mixing strategies according to the present invention, the voice data of each participant is represented in FIG. 9 by an arrow identified by the node letter representing that participant. The arrows are located between the various participant nodes and a central mixing hub 94 to indicate which voice data is transmitted to and from which node.

Figure 10:
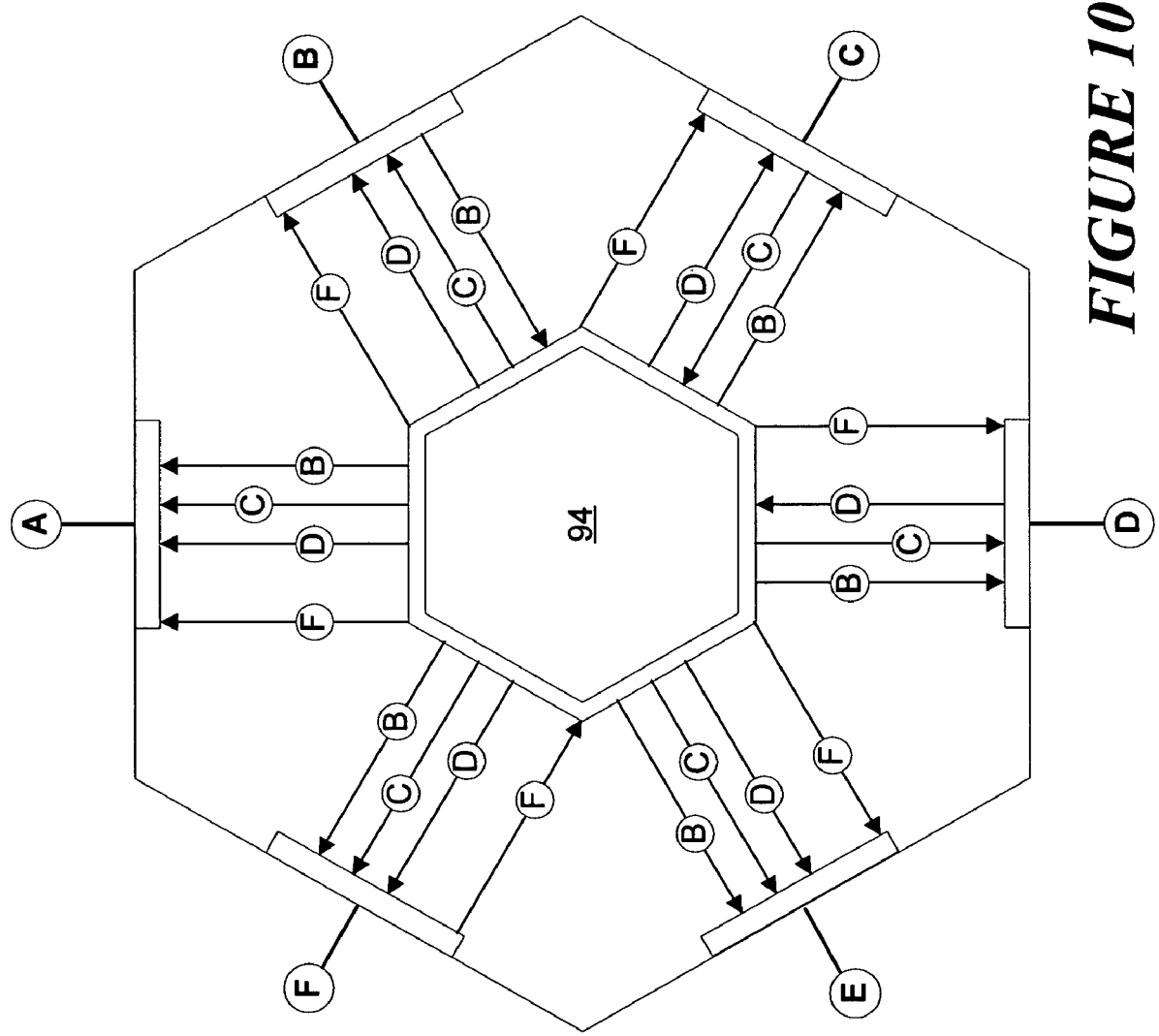
FIG. 10 is a graphical depiction of an audio mixing strategy similar to FIG. 8 at a time when a voice chat is taking place among several meeting participants.

FIG. 9 represents a meeting in which no voice chats have been established, and for which none of the participants have muted his or her audio input. Thus, for each node, there is an input audio signal to the hub 94 from that node, and equal output audio contributions from each of the other nodes. That is, each participant can speak and be heard by all of the other meeting participants. FIG. 10 represents a situation in which there are no voice chats established, but in which two participants, "A" and "E," have muted their audio inputs, perhaps in an effort to limit extraneous noise. As shown, this results in there being no audio inputs from nodes "A" or "E" and, as such, no audio contributions are received from "A" and "E" by the other nodes. Of course, all of the nodes still receive audio contributions from nodes B, C, D and F, whose participants may speak and be heard in the meeting.

The initiation of a voice chat also has effects on the audio inputs and outputs, as discussed above. From a situation in which there are no current voice chats and none of the meeting participants has his or her audio muted (as in FIG. 9), the initiation of a voice chat has effects on the audio contributions as shown in FIG. 11. In this example, the participants in the voice chats are those parties represented by nodes "B," "C" and "D." When selected participants join the voice chat, the audio for those participants is muted in the main meeting. As a result, the audio contributions of "B," "C" and "D" are no longer received by "A," "E" and "F," but are still received by the parties to the voice chat. Meanwhile, the audio from the main meeting, now limited to the contributions of "A," "E" and "F," is still heard by the participants to the voice chat, only at an attenuated volume. This is indicated in FIG. 11 by the arrows representing those audio contributions being shown in broken lines. Of course, those not participating in the voice chat still hear the main meeting audio contributions at full volume.

With the foregoing examples, those skilled in the art will quickly recognize how the audio mixing is affected by the initiation of a voice chat. Moreover, as the manner of mixing audio streams is well known in the art, generating the different mixing conditions described herein will be readily achievable without additional description.

While the invention has been shown and described with reference to a preferred embodiment thereof, it will be recognized by those skilled in the art that various changes in form and detail may be made herein without departing from the spirit and scope of the invention as defined by the appended claims.

What is claimed is:

1. A computer program product for facilitating interaction between network clients having access to a digital network, the computer program product comprising a computer usable medium having computer readable program code thereon, including:
    program code for accepting audio inputs from network clients, and providing audio outputs to network clients that comprise a mix of said audio inputs;
    program code for enabling a network client to participate in a collaboration in which certain collaborating clients are connected together such that audio inputs from the collaborating clients are mixed together and delivered to the collaborating clients as audio outputs;
    program code for allowing a subset group of fewer than all of the collaborating clients to initiate a voice chat comprising private audio communication with one another without interrupting said collaboration, the audio inputs of those in the subset group of collaborating clients that are participating in the voice chat being omitted from the audio outputs delivered to the collaborating clients that are not part of the subset group;
    program code for a main display window displayed on a video monitor of a collaborating client, the main display window listing the identities of all of the collaborating clients; and
    program code for a voice chat display window displayed on a video monitor of clients in the subset group, the voice chat display window listing the identities of all of the clients in the subset group.

2. The computer program product according to claim 1 wherein the main display window includes indicia indicating that the audio inputs of the subset group of collaborating clients are muted while they are participating in the voice chat.

3. The computer program product according to claim 1 wherein members of the subset group remain part of the subset group when rejoining the audio communication in said collaboration, and wherein the audio input of a member of the subset group, upon that member rejoining the audio communication of said collaboration, is added back to the audio outputs of the collaborating clients that are not part of the subset group.

4. The computer program product according to claim 3 wherein a member of the subset group that has rejoined the audio communication in said collaboration returns to participating in the voice chat and, upon doing so, the audio input of that member of the subset group is omitted from the audio outputs of the collaborating clients that are not part of the subset group.

5. The computer program product according to claim 3 wherein the voice chat display window includes indicia indicating when a member of the subset group of collaborating clients has rejoined the audio communication of said collaboration.

6. The computer program product according to claim 3 wherein the voice chat window includes a speaking indicator that identifies a member of the subset group from which an audio input volume is exceeding a particular threshold.

7. The computer program product according to claim 1 wherein the audio output delivered to a member of the subset group that is participating in the voice chat includes the audio inputs of the collaborating clients that are not part of the subset group, but at an attenuated volume relative to the volume of the audio inputs from the members of the subset group.

8. A method of facilitating interaction between network clients having access to a digital network using an audio communications tool that accepts audio inputs from network clients, and provides audio outputs to network clients that comprise a mix of said audio inputs, the method comprising:
    mixing the audio inputs of network clients upon the initiation of a collaboration function using a network interface, the mixing of the audio inputs being such that an audio output is provided selectively to each of the network clients that comprises a customized mix of the audio inputs of the other clients;
    altering the mix of audio inputs upon the initiation of a voice chat feature that allows a subset group of fewer than all of the collaborating clients to engage in a private audio communication with one another without interrupting said collaboration, the alteration of the mix including the omitting of the audio inputs of those in the subset group of collaborating clients that are participating in the voice chat from the audio outputs delivered to the collaborating clients that are not part of the subset group;
    wherein the network interface comprises a main display window displayed on a video monitor of each collaborating client, the main display window listing the identities of all of the collaborating clients; and
    wherein the network interface comprises a voice chat display window displayed on a video monitor of clients in the subset group, the voice chat display window listing the identities of all of the clients in the subset group.

9. A method according to claim 8 further comprising displaying, in the main display window indicia indicating that the audio inputs of the subset group of collaborating clients are muted while they are participating in the voice chat.

10. A method according to claim 9 wherein members of the subset group remain part of the subset group when rejoining the audio communication in said collaboration, and wherein the altering of the mix of audio inputs includes adding the audio input of a member of the subset group, upon that member rejoining the audio communication of said collaboration, back to the audio outputs of the collaborating clients that are not part of the subset group.

11. A method according to claim 10 wherein a member of the subset group that has rejoined the audio communication in said collaboration returns to participating in the voice chat, and wherein the altering of the mix of audio inputs includes responding to said rejoining by omitting the audio input of the rejoining member of the subset group from the audio outputs of the collaborating clients that are not part of the subset group.

12. A method according to claim 10 further comprising displaying indicia in the voice chat display window indicative of when a member of the subset group of collaborating clients has rejoined the audio communication of said collaboration.

13. A method according to claim 10 further comprising displaying in the voice chat window a speaking indicator that identifies a member of the subset group from which an audio input volume is exceeding a particular threshold.

14. A method according to claim 8 wherein altering the mix of audio inputs further comprises including, in the audio output delivered to a member of the subset group that is participating in the voice chat, the audio inputs of the collaborating clients that are not part of the subset group, but at an attenuated volume relative to the volume of the audio inputs from the members of the subset group.

* * * * *